United States Patent [19]

Borkowicz et al.

[11] Patent Number: 5,398,152
[45] Date of Patent: Mar. 14, 1995

[54] OVERVOLTAGE PROTECTOR

[75] Inventors: George J. Borkowicz, Nepean; Paul A. Taylor, Stittsville, both of Canada

[73] Assignee: Northern Telecom Limited, Montreal, Canada

[21] Appl. No.: 128,415

[22] Filed: Sep. 30, 1993

[51] Int. Cl.[6] .............................................. H02H 3/22
[52] U.S. Cl. .................................. 361/119; 361/127; 337/30; 337/32
[58] Field of Search ................ 361/119, 124, 125, 127; 337/28, 30, 31, 32

[56] References Cited

U.S. PATENT DOCUMENTS

| | | | |
|---|---|---|---|
| 3,825,867 | 7/1974 | Georgopulos | 337/32 |
| 4,729,055 | 3/1988 | Dorival et al. | 361/119 |
| 4,851,956 | 7/1989 | Borkowicz et al. | 361/118 |
| 4,912,529 | 3/1990 | Flindall et al. | 361/120 |
| 4,939,619 | 7/1990 | Borkowicz et al. | 361/118 |
| 4,984,125 | 1/1991 | Uwano | 361/124 |
| 5,027,100 | 6/1991 | Neuwirth et al. | 361/124 |
| 5,155,649 | 10/1992 | Hung et al. | 361/119 |

Primary Examiner—Todd Deboer
Attorney, Agent, or Firm—John E. Mowle

[57] ABSTRACT

An overvoltage protector for protection of telecommunication equipment having a pair of line terminals, and a respective pair of levers forming part of the ground circuit, with an overvoltage protective device bonded under tension between each line terminal and each respective lever. When an overvoltage destroys one or other device, or the bond between the line terminal and the respective lever disappears, that lever pivots about a single fulcrum under a force applied by a spring and the end of that lever contacts the line terminal. This ensures an electrically conductive relation between the line terminal and the ground circuit. As a result, the equipment to which the overvoltage protector is applied is protected from lightning and successive overvoltage occurrence.

5 Claims, 1 Drawing Sheet

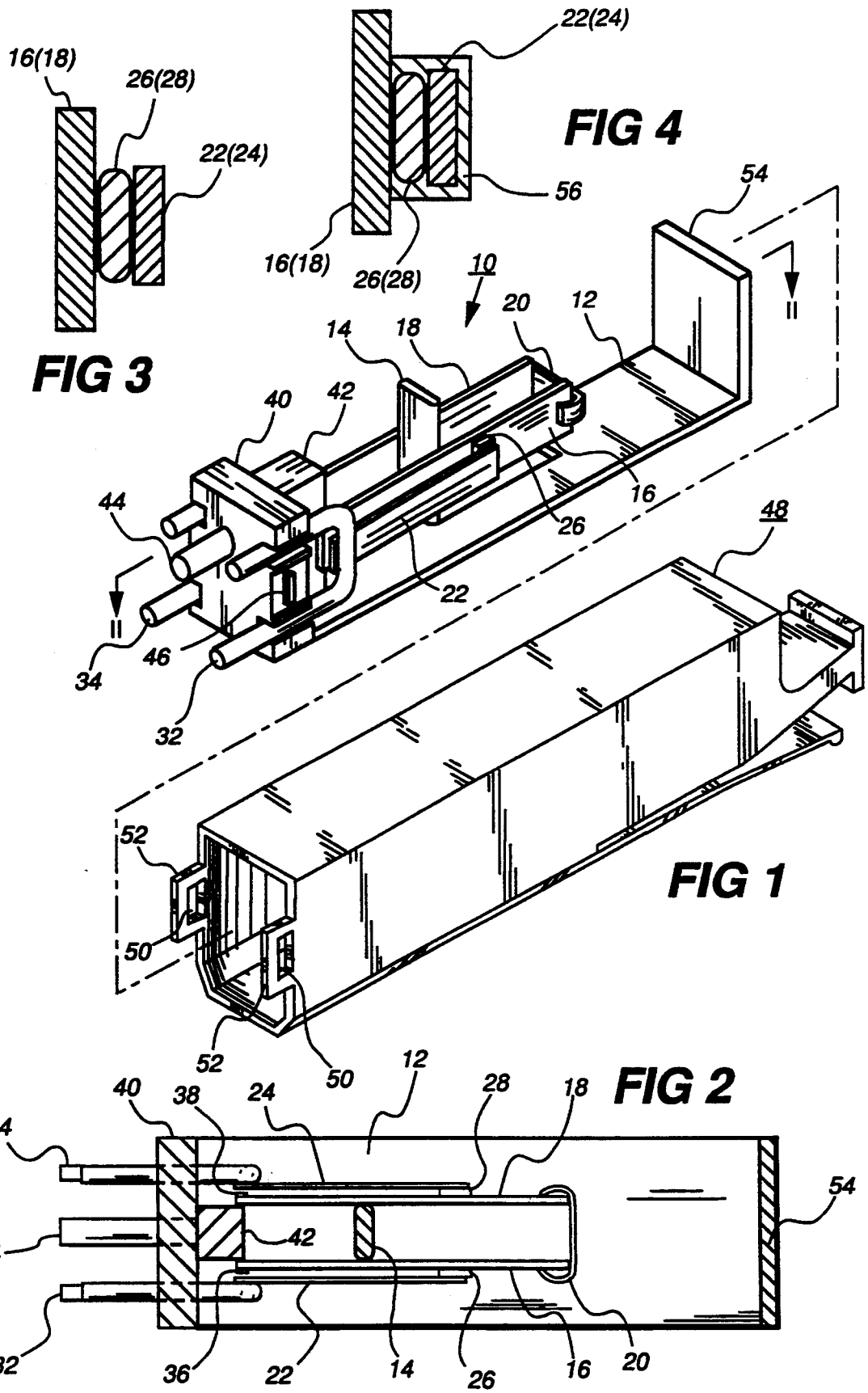

OVERVOLTAGE PROTECTOR

TECHNICAL FIELD

The present invention relates to an overvoltage protector for protection of telecommunication equipment, and in particular to a protector for protecting the equipment against high voltage and/or current caused by lightning in the vicinity of the equipment or the cables to which it is connected.

BACKGROUND ART

A conventional overvoltage protector is usually comprised of a pair of elements such as carbon blocks or gas tubes mounted within a housing. Fusible elements, typically discs of solder, are associated with each one of the elements. The arrangement is such that, when an overload condition persists, for example when a power line contacts the telephone line for an extended period of time, the heat generated in the overvoltage element will cause the associated fusible element to melt, thereby establishing a secondary circuit which by-passes the overvoltage element.

More recently the carbon blocks and gas tubes have been replaced by solid state devices. U.S. Pat. Nos. 4,851,956 and 4,939,619 which issued on Jul. 25, 1989, and Jul. 3, 1990, respectively, both to Borkowicz et al. disclose a protector using solid state semiconductor devices, which function as overvoltage protection elements. The two electrodes of each semiconductor protection device are connected between a signal line conductor and a ground of the telephone equipment to be protected, and are under external spring pressure. Each semiconductor protection device fulfils a specific role, both before and after failure, in the circuit where it is a component. Under normal conditions where there is no high voltage or lightning, there is a high impedance between the signal line conductor and the ground through the semiconductor protection device. When an instantaneous high voltage is present between the signal line conductor and the ground terminal, the device turns on and current flows through it to provide an effective short-circuit to ground. If the high voltage ceases without destroying the protection device, it returns to the normal high impedance condition so that the short-circuit will no longer be developed therethrough. However, if an overvoltage surge of high magnitude is present for an extended period of time, the protection device will destructive, and the two electrodes thereof are forced by the associated spiral spring into an electrically conductive relation. Therefore, a conductive short-circuit is created between the signal line conductor and the ground in the circuit through the electrodes of the protection device, and the short-circuit is sustained due to the external pressure of the springs, so that associated telephone equipment is protected from overvoltage/overcurrent. However, these known overvoltage protectors are complicated because of the complexity of the mechanism for applying the external pressure. Alternately, the protector disclosed in U.S. Pat. No. 4,939,619 has cantilever springs which hold the protective devices. However, under the conditions of overcurrent flowing in the springs, they may anneal and loose their elasticity with the result of poor ground contact, thereby leaving the associated equipment unprotected.

SUMMARY OF THE INVENTION

The present invention provides an overvoltage protector which has a simple and effective mechanical structure.

According to one aspect of the present invention, an overvoltage protector comprises: a line side-conductive pathway including a line terminal; a ground side-conductive pathway including a lever pivotable about a fulcrum; a spring which applies a force to the lever to urge one end of the lever toward the line terminal; and an overvoltage protective device bonded under tension between the line terminal and the lever. In the overvoltage protector, upon either destruction of the overvoltage protective device or a break in the bond, the lever will pivot about the fulcrum so that said one end of the lever contacts the line terminal with the result that the line side-conductive pathway and the ground side-conductive pathway are short-circuited. The equipment to which the overvoltage protector is applied is protected from an overvoltage occurring on the line circuit of the equipment.

According to a second aspect of the present invention, an overvoltage protector comprises: a line side-conductive pathway including a pair of line terminals; a ground side-conductive pathway including a substantially coextensive pair of levers, each being pivotable about a fulcrum; a spring which applies a force to the one ends of both levers to urge them toward the respective line terminals; and a pair of overvoltage protective devices, each device being bonded under tension between a respective one of the line terminals and one of the levers. In the overvoltage protector, upon either destruction or a break in the bond of either one of the overvoltage protective devices, the associated lever will pivot about the fulcrum so that said one end of the lever contacts the line terminal with the result that the line side-conductive pathway and the ground side-conductive pathway are short-circuited. With the short-circuit, the equipment is protected from successive overvoltage/overcurrent occurrences.

In the embodiment of the present invention, the line side-conductive pathway and the ground side-conductive pathway are directly short-circuited through the fulcrum bypassing the spring. Therefore, under the conditions of overcurrent flowing in the conductive pathways, the spring cannot anneal because of heat caused by current passing through it, and the short-circuit will be kept appropriately, thereby improving the safety of the protector.

BRIEF DESCRIPTION OF THE DRAWINGS

An embodiment of the present invention will now be described by way of example only with reference to the accompanying drawings in which:

FIG. 1 is an exploded isometric view of an overvoltage protector according to the present invention;

FIG. 2 is a cross-sectional view on line II—II of FIG. 1;

FIG. 3 is a sectional view of an overvoltage protective device for use in the overvoltage protector shown in FIGS. 1 and 2; and FIG. 4 illustrates an encapsulated overvoltage protective device.

BEST MODE FOR CARRYING OUT THE INVENTION

FIGS. 1–3 illustrate an overvoltage protector for use in protecting equipment (not shown) in a telephone central office. The overvoltage protector includes an assembly 10 which has a conductive elongated plate 12. An elongated fulcrum member 14 is partially cut away from the plate 12 at the center thereof and bent at a right angle. Two conductive lever plates 16 and 18 are parallel with each other and sandwich the fulcrum member 14 at their intermediate point over the plate 12. An arc-shaped spring 20 is hooked to one end of both lever plates 16 and 18. Two rigid terminal conductors 22 and 24 are parallel with the lever plates 16 and 18, respectively. An overvoltage protective device 26 is bonded between the lever plate 16 and the terminal conductor 22. Both sides of the overvoltage protective device (semiconductor chip) 26 are adhered to the lever plate 16 and the terminal conductor 22 by solder. Also, another overvoltage protective device 28 is bonded between the lever plate 18 and the terminal conductor 24 and adhered to them. The lever plates 16, 18 together with the fulcrum member 14, the arc-shaped spring 20 and the overvoltage protective device 26, 28 initially function as a second class lever.

The overvoltage protective devices 26 and 28 are each a solid state device, typically a voltage-triggered semiconductor device providing bi-directional overvoltage protection. Instead of the bi-directional overvoltage protective device, two uni-directional overvoltage protective devices may be used for each of the overvoltage protective devices 26 and 28.

U-shape line terminal pins 32 and 34 are connected to the terminal conductors 22 and 24, respectively. The lever plate 16 has at the other end thereof a protrusion 36 which faces with the terminal conductor 22. The lever plate 18 also has a protrusion 38 which faces the terminal conductor 24.

An insulated base 40 through which the two U-shape line terminal pins 32 and 34 protrude is at one end of the plate 12. An elongated connector 42 is disposed on the inside surface of the insulated base 40 and contacts the one end of the plate 12. The connector 42 is connected to a ground terminal pin 44, which protrudes through the insulated base 40. The connector 42 is adjacent to the other ends of the lever plates 16 and 18 and between both lever plates to prevent each of the lever plates 16 and 18 from moving inwardly.

The arc-shaped spring 20 which is hooked to both lever plates 16 and 18 applies inwardly pressure to the ends of the lever plates 16 and 18, so that the other ends of the lever plates 16 and 18 are urged outwardly about the fulcrum member 14. With the force of the spring 20, tensions are caused in the overvoltage protective devices 26, 28 bonded between the respective lever plates 16, 18 and the terminal conductors 22, 24. The lever plate 16 is balanced so that the protrusion 36 of the lever plate 16 does not contact the terminal conductor 22 under normal conditions. Neither does the protrusion 38 of the lever plate 18 contact the terminal conductor 24 under normal conditions because of the tension of the overvoltage protective device 28.

Two lugs 46 (only one is shown) protrude laterally from the two side edges of the insulated base 40. When the assembly 10 is inserted into a housing 48, the lugs 46 engage in the holes 50 in extensions 52 of the housing 48, and an end portion 54 of the plate 12 touches the wall of the closed end of the housing 48, so that the assembly 10 is stable inside the housing 48. The insulated base 40 is adjacent the open end of the housing 48.

The assembled overvoltage protector is installed in the equipment having a line circuit and a ground circuit. The line circuit has two signal line conductors—"tip" and "ring" conductors. The ground circuit has a ground conductor. The line terminal pin 32 is connected to the "tip" conductor of the equipment to be protected from overvoltage, so that the connection forms a line side-conductive pathway for both "tip" conductors. The line terminal pin 34 is connected to the "ring" conductors of the equipment, so that the connection forms a line side-conductive pathway for both "ring" conductors. The ground terminal pin 44, electrically connected to the connector 42 and the plate 12, will make contact with the ground conductor of the equipment, so that the connection forms a ground side-conductive pathway for the ground conductor of the equipment. The overvoltage protective device 26 is presented between the line terminal pin 32 and the ground. The overvoltage protective device 28 is held between the line terminal pin 34 and the ground. Under normal conditions, neither "tip" nor "ring" conductor is short-circuited to the ground, through the overvoltage protective device 26 or 28, each overvoltage protective device having a high impedance.

When the overvoltage protector which is installed in the equipment to be protected from overvoltage is in use, and an overvoltage due to lightning, for instance, occurs on the "tip" conductor, the overvoltage protective device 26 may be physically destroyed or the bond between the overvoltage protective device 26 and the terminal conductor 22 or the lever plate 16 is broken. With the destruction of the overvoltage protective device 26 or a break in the bond, the tension caused between the lever plate 16 and the terminal conductor 22 disappears so that the lever plate 16 pivots about the fulcrum member 14 as a first class lever. The force applied by the arc-shaped spring 20 causes the other side end of the lever plate 16 to outwardly pivot about the fulcrum member 14 and the protrusion 36 of the lever plate 16 contacts the terminal conductor 22. A physical contact and an electrically conductive relation is maintained between the lever plate 16 and the terminal conductor 22 because of the force caused by the arc-shaped spring 20. As a result, a short-circuit is created and maintained between the "tip" conductor and the ground conductor of the equipment to be protected through the terminal pin 32, the terminal conductor 22, the lever plate 16, the fulcrum member 14, the plate 12, the connector 42 and the ground terminal pin 44.

As well, if an overvoltage occurs on the "ring" conductor and the overvoltage protective device 28 is destroyed or the bond is broken, tension between the lever plate 18 and the terminal conductor 24 is released and the lever plate 18 pivots about the fulcrum member 14. The protrusion 38 of the lever plate 18 then contacts the terminal conductor 24 due to the force applied by the arc-shaped spring 20. A short-circuit is created between the "ring" conductor and the ground conductor of the equipment to be protected. The created short-circuit is maintained by the force applied by the arc-shaped spring 20 until it is released.

Hence, once either overvoltage protective device 26 or 28 is destroyed or the bond is broken and a short-circuit is created between the signal line conductor and the ground conductor of the equipment to be protected from overvoltage, no longer is there an open circuit between the signal line conductor and the ground conductor. The equipment in the telephone central office is properly protected from successive occasions of overvoltage. In addition, although there is a large overcurrent due to lightning or contact to a high voltage power line, this current flows through the lever plate 16 (or lever plate 18), the fulcrum member 14 and the plate 12, thereby bypassing the arc-shaped spring 20. Therefore, the spring 20 is not annealed and does not loose its elasticity, and a short-circuit is kept appropriately.

Each of the overvoltage protective devices 26 and 28 may be sealed by a resin capsule 56 together with the respective terminal conductor 22 or 24, as shown in FIG. 4. The capsule 56 protects the overvoltage protective devices 26 and 28 from moisture and dirt and improves reliability of the overvoltage protective devices 26 and 28. When an overvoltage occurs and either the overvoltage protective device 26 or 28 is destroyed or the bond is broken, the capsule 56 will crack or disintegrate, and the lever plate 16 or 18 pivots to create a short-circuit.

Alternatively, other type of springs, instead of the arc-shaped spring 20, may be mounted so that each lever (either lever plate 16 or 18) pivots about the fulcrum member 14. Instead of the common single fulcrum member 14, a separate fulcrum may be used for each lever.

What is claimed is:

1. An overvoltage protector comprising:
   a line side-conductive pathway including a line terminal;
   a ground side-conductive pathway including a lever pivotable about a fulcrum;
   a spring which applies a force to the lever to urge one end of the lever toward the line terminal; and
   an overvoltage protective device bonded under tension between the line terminal and the lever,
   wherein upon either destruction of the overvoltage protective device or a break in the bond, the lever will pivot about the fulcrum so that said one end of the lever contacts the line terminal with the result that the line side-conductive pathway and the ground side-conductive pathway are short-circuited.

2. The overvoltage protector of claim 1, wherein the overvoltage protective devices is encapsulated by resin.

3. An overvoltage protector comprising:
   a line side-conductive pathway including a pair of line terminals;
   a ground side-conductive pathway including a substantially coextensive pair of levers, each being pivotable about a fulcrum;
   a spring which applies a force to the one ends of both levers to urge them toward the respective line terminals; and
   a pair of overvoltage protective devices, each device being bonded under tension between a respective one of the line terminals and one of the levers,
   wherein upon either destruction or a break in the bond of either one of the overvoltage protective devices, the associated lever will pivot about the fulcrum so that said one end of the lever contacts the line terminal with the result that the line side-conductive pathway and the ground side-conductive pathway are short-circuited.

4. The overvoltage protector of claim 3, wherein the pair of levers are pivotable about a single fulcrum.

5. The overvoltage protector of claim 3, wherein each of the overvoltage protective devices is encapsulated by resin.

* * * * *